(12) United States Patent
Dunphy et al.

(10) Patent No.: US 6,484,182 B1
(45) Date of Patent: Nov. 19, 2002

(54) METHOD AND APPARATUS FOR PUBLISHING PART DATASHEETS

(75) Inventors: Betsy D. Dunphy, Shelburne, VT (US); Louis Evart, Berkeley, CA (US); George Lund, Oakland, CA (US); Josh MacDonald, Berkeley, CA (US); Jim L. Rogers, Milton, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/330,805

(22) Filed: Jun. 11, 1999

Related U.S. Application Data

(60) Provisional application No. 60/089,372, filed on Jun. 12, 1998.

(51) Int. Cl.[7] .............................................. G06F 17/30
(52) U.S. Cl. ........................ 707/104; 707/100; 707/101; 707/102; 707/2; 707/3; 707/201; 707/515; 705/7; 705/26; 705/500; 700/231
(58) Field of Search ................... 707/2, 3, 100, 707/5, 201, 515, 101, 102, 104; 705/2, 7, 26, 500; 395/701; 700/231

(56) References Cited

U.S. PATENT DOCUMENTS

| | | | |
|---|---|---|---|
| 4,931,929 A | 6/1990 | Sherman | 705/500 |
| 4,992,940 A | 2/1991 | Dworkin | 705/26 |
| 5,317,729 A | 5/1994 | Mukherjee et al. | 707/3 |
| 5,550,746 A | 8/1996 | Jacobs | 700/231 |
| 5,675,784 A | 10/1997 | Maxwell et al. | 707/100 |
| 5,726,898 A | 3/1998 | Jacobs | 700/231 |
| 5,740,425 A | 4/1998 | Povilus | 707/100 |
| 5,745,910 A * | 4/1998 | Piersol et al. | 707/515 |
| 5,765,137 A | 6/1998 | Lee | 705/7 |
| 5,768,142 A | 6/1998 | Jacobs | 700/231 |
| 5,797,128 A | 8/1998 | Birnbaum | 707/5 |
| 5,835,919 A * | 11/1998 | Stern et al. | 707/515 |
| 5,855,013 A * | 12/1998 | Fisk | 707/3 |
| 5,987,468 A * | 11/1999 | Singh et al. | 707/100 |
| 5,991,728 A * | 11/1999 | DeBusk et al. | 705/2 |
| 6,072,949 A * | 6/2000 | Futatsugi et al. | 395/701 |
| 6,208,987 B1 * | 3/2001 | Nihei | 707/3 |
| 6,212,530 B1 * | 4/2001 | Kadlec | 707/201 |

* cited by examiner

Primary Examiner—Charles L. Rones
Assistant Examiner—Thuy Pardo
(74) Attorney, Agent, or Firm—Schmeiser, Olsen & Watts; Richard M. Kotulak

(57) ABSTRACT

A method and apparatus are provided for publishing part datasheets. A part characterization database is created, and the technical characteristics of parts in the database are ascertained. In addition to parts, part groups are created based on common technical characteristics of parts, and a database tree is created based on the technical characteristics of parts and part groups. A publishing interface coupled to the part characterization database is provided for coupling a publishing tool to the part characterization database so as to provide context to the technical characteristics of one or more parts characterized within the part characterization database. A computer program product also is provided for publishing part datasheets. The computer program product comprises means for creating the part characterization database, means for ascertaining the technical characteristics of parts in the database and means for creating part groups based on common technical characteristics of parts. The computer readable medium also comprises means for creating a database tree based on the technical characteristics of parts and part groups and means for providing a publishing interface for coupling a publishing tool to the part characterization database so as to provide context to the technical characteristics of one or more parts characterized within the part characterization database.

32 Claims, 9 Drawing Sheets

FIG. 5

| Symbol | Charateristic | Value | | Tree Characteristic |
|---|---|---|---|---|
| Type | Corporate Division | Memory | ▷ | ☑ |
| Type | RAM Type | DRAM | ▷ | ☑ |
| VDD | Device Supply Voltage(ID) | 3.30V | ▷ | ☐ |
| Power | Power | SP | ▷ | ☐ |
| SR | Self Refresh | Yes | ▷ | ☐ |
| Type | Sync Type | Synchronous | ▷ | ☑ |
| Type | Sync Feature Type | SDRAM | ▷ | ☑ |
| CA | Column Addressing | 8 b | ▷ | ☐ |
| RA | Row Addressing | 12 b | ▷ | ☐ |
| DR | Data Rate | Single | ▷ | ☐ |
| BA | Bank Addressing | 2 | ▷ | ☐ |
| ICK3 | Speed | 10 ns | ▷ | ☐ |
| Type | Device/Module | Device | ▷ | ☑ |
| ORG | DRAM Organization | 16 b | ▷ | ☐ |
| Rev | Revision | B | ▷ | ☐ |
| PW | Package Width | 0.400" | ▷ | ☐ |
| PT | Package type | TSOP forward lead | ▷ | ☐ |
| D Density | Density | 64 Mb | ▷ | ☐ |
| T Spec | Timing Spec | JEDEC | ▷ | ☑ |

Pin Count 54         Mode Group  1Mx16x4\Bank\SDRAM\Planar ▷
Part Number 036416CT3B-10
Add    Okay

| Symbol | Charateristic | Value | | Tree Characteristic |
|---|---|---|---|---|
| BA | Bank Addressing | <N/A> | ▷ | ☐ |
| CA | Column Addressing | <N/A> | ▷ | ☐ |
| D Density | Density | 64 Mb | ▷ | ☐ |
| DR | Data Rate | Single | ▷ | ☐ |
| ORG | DRAM Organization | <N/A> | ▷ | ☐ |
| PT | Package Type | <N/A> | ▷ | ☐ |
| PW | Package Width | <N/A> | ▷ | ☐ |
| Power | Power | B | ▷ | ☐ |
| RA | Row Addressing | <N/A> | ▷ | ☐ |
| Rev | Revision | <N/A> | ▷ | ☐ |
| SR | Self Refresh | JEDEC | ▷ | ☑ |
| T Spec | Timing Spec | Memory | ▷ | ☑ |
| Type | Corporate Division | Synchronous | ▷ | ☑ |
| Type | Sync Type | SDRAM | ▷ | ☑ |
| Type | Sync Feature Type | Device | ▷ | ☑ |
| Type | Device/Module | DRAM | ▷ | ☑ |
| Type | RAM Type | 3.30V | ▷ | ☐ |
| VDD | Device Supply Voltage (ID) | <All> | ▷ | ☐ |
| ICK3 | Speed | | | |

[Add] [Okay]   [N/A All]

METHOD AND APPARATUS FOR PUBLISHING PART DATASHEETS

This application claims priority from U.S. provisional application Serial No. 60/089,372, filed Jun. 12, 1998 now abandoned.

FIELD OF THE INVENTION

The present invention relates to the exchange of part information, and more particularly to a method and apparatus for publishing part datasheets.

BACKGROUND OF THE INVENTION

An ever present need exists for the rapid exchange of part information between suppliers, distributors and customers. For example, within the semiconductor industry, part information (e.g., information regarding electronic components, printed circuit boards, component packaging, etc.) typically is exchanged in either electronic or printed format as part datasheets comprising electrical specifications, timing diagrams, timing information, other descriptive diagrams, encapsulated models and the like.

One approach for expediting the exchange of semiconductor-related part information is the Electronic Component Information Exchange (ECIX) project initiated by leading electronic component manufacturers. The ECIX project provides a suite of standards for the electronic exchange of information regarding electronic products (e.g., electronic components, printed circuit boards, etc.), including a Pinnacles Component Standard (PCIS) for the generation of part datasheets.

Despite the ECIX project, the generation of part datasheets employing PCIS or any other convention typically is a difficult, time consuming and manual process. Accordingly, a need exists for an improved method and apparatus for publishing part datasheets.

SUMMARY OF THE INVENTION

To overcome the needs of the prior art, an inventive method and apparatus are provided for publishing part datasheets. A part characterization database (e.g., a relational database) is created, and the technical characteristics of parts in the database are ascertained (e.g., parts within the database are defined by a set of identifying characteristics). In addition to parts, part groups are created based on common technical characteristics of parts, and a database tree is created based on the technical characteristics of parts. A publishing interface coupled to the part characterization database is provided for coupling a publishing tool to the part characterization database so as to provide context to the technical characteristics of one or more parts characterized within the part characterization database (e.g., to allow for easy formatting of a part's technical characteristics within a part datasheet via one or more presentation tables).

A computer program product also is provided for publishing part datasheets. The inventive computer program product is carried by a medium readable by a computer (e.g., a carrier wave signal, a floppy disc, a hard drive, a random access memory, etc.). The computer readable medium comprises means for creating the part characterization database, means for ascertaining the technical characteristics of parts in the database and means for creating part groups based on common technical characteristics of parts. The computer readable medium also comprises means for creating a database tree based on the technical characteristics of parts and means for providing a publishing interface for coupling a publishing tool to the part characterization database so as to provide context to the technical characteristics of one or more parts characterized within the part characterization database.

By having technical characteristics associated with a part group shared by multiple parts, each part's characteristics may be maintained merely by maintaining the part group's characteristics (rather than each individual part's characteristics). Additionally, parts having any combination of product options can be characterized merely by combining appropriate part groups having the desired characteristics (e.g., characteristics can exist in the database for "virtual" parts not even considered by designers). Once generated, a part datasheet can be updated merely by reconnecting to the part characterization database to retrieve updated part information.

Other objects, features and advantages of the present invention will become more fully apparent from the following detailed description of the preferred embodiments, the appended claims and the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit of a reference number identifies the drawing in which the reference number first appears.

FIG. 5 is an exemplary GUI for adding a part to the part characterization database of FIG. 1;

FIG. 6 is an exemplary GUI for adding a part group to the part characterization database of FIG. 1;

DETAILED DESCRIPTION OF THE PREFERRED EMBODIMENTS

Figure 1:
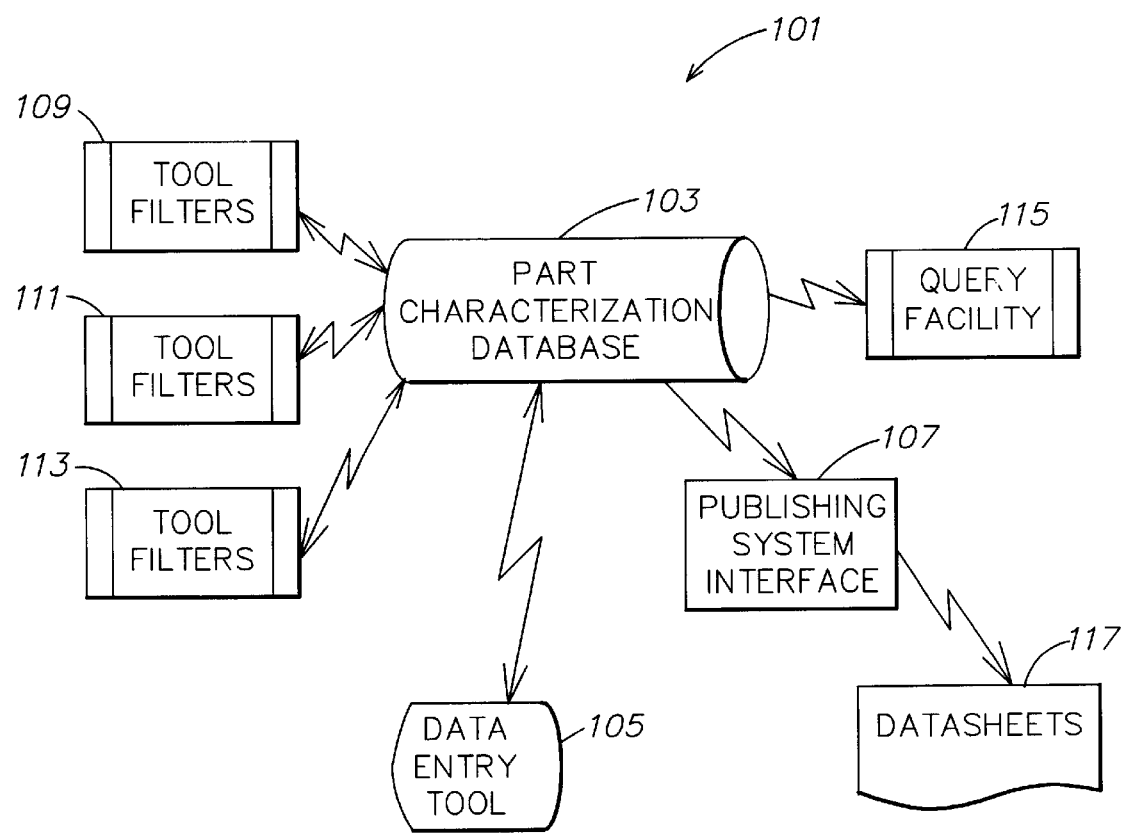
FIG. 1 is a schematic diagram of a novel datasheet publishing system for storing and editing part information and for generating part datasheets based thereon.

FIG. 1 is a schematic diagram of a novel datasheet publishing system 101 for storing and editing part information and for generating part datasheets based thereon. The novel datasheet publishing system 101 comprises, in pertinent part, a part characterization database 103 coupled to a data entry tool 105 and to a publishing interface 107. As described further below, the part characterization database 103 serves as a primary repository of part characterization information (e.g., electrical specifications, timing diagrams, timing information, other descriptive diagrams, etc.) and preferably comprises a relational database employing standard query language (SQL) such as Oracle®, Oracle 7™, or IBM DB2™.

The data entry tool 105 comprises a computer program product that serves as the primary interface to the part characterization database 103. Additionally, other interfaces may be provided to transfer information to and from the part characterization database 103. For example, one or more tool interfaces (e.g., first, second and third tool filters 109, 111 and 113) may be employed to allow seamless movement of data between a number test tools (e.g., electronic design automation tools, semiconductor test tools or other analysis/ testing tools and/or simulators as are known in the art) and the part characterization database 103. A query facility 115 also is provided that allows the various part information stored within the part characterization database 103 to be gathered and placed in a data file (e.g., a delimited file importable by conventional spreadsheet applications) for part comparisons and/or to affect other information presentation formats.

The publishing interface 107 similarly comprises a computer program product that provides an interface from the part characterization database 103 to publishing tools (e.g., Adobe Framemaker) and that allows publishing tools real time access to the part characterization database 103. The primary role of the publishing interface 107 is to allow publishing tools to generate part datasheets 117 based on the part characterization information stored within the part characterization database 103.

The data entry tool 105 and the publishing interface 107 may be written in any known programming language (e.g., C, C++, Pascal, JAVA, etc.) and may run on any suitable computer system. The data entry tool 105 and the publishing interface 107 preferably are written in JAVA so that the part characterization database 103, the data entry tool 105 and the publishing interface 107 can run on one or a combination of network platforms and data can be accessed and/or linked to other corporate databases (not shown) to provide expanded views of part information. The data entry tool 105 and the publishing interface 107 may comprise one application or separate applications.

Figure 2:
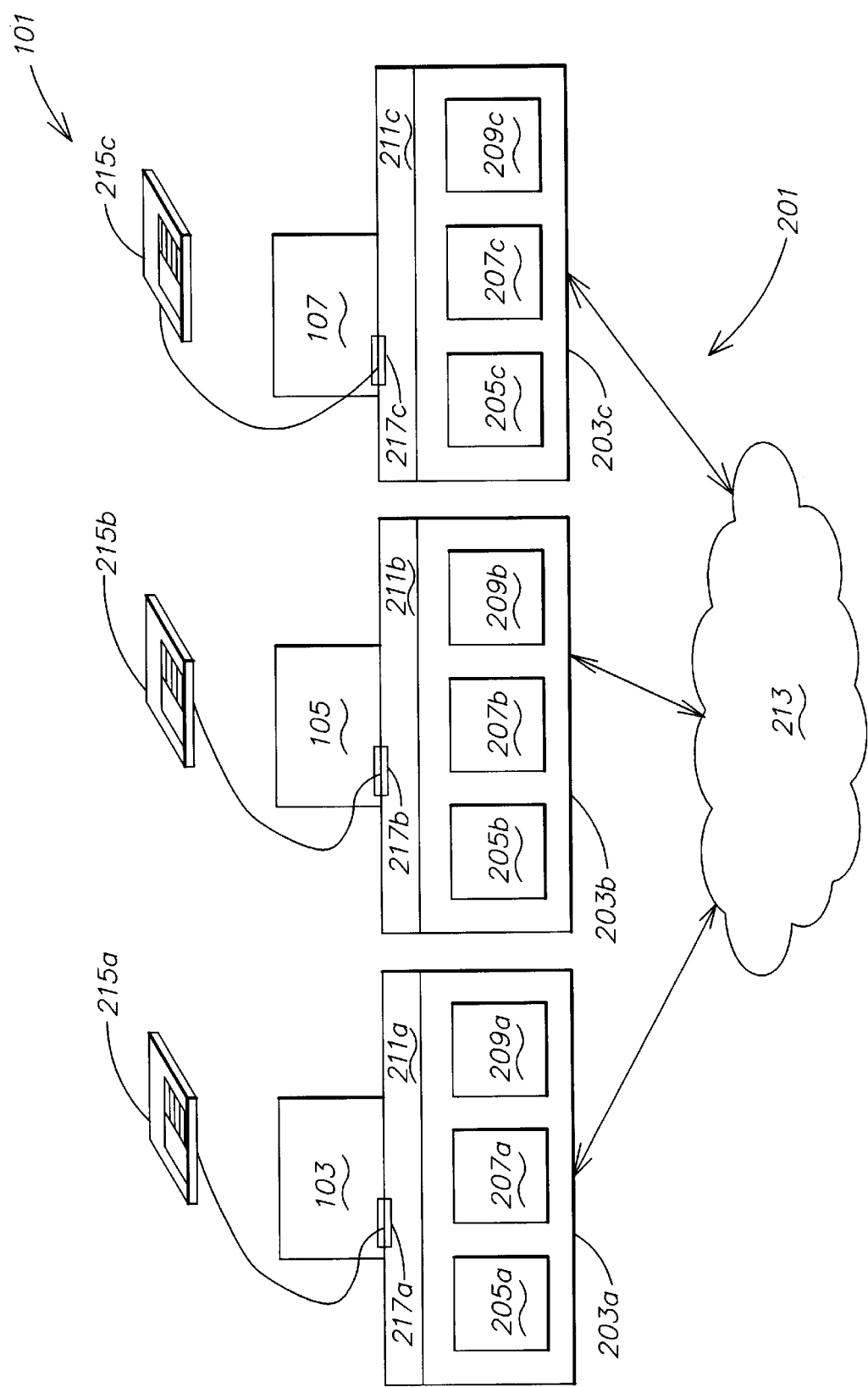
FIG. 2 is a block diagram illustrating a computer network which stores and runs the novel datasheet publishing system of FIG. 1.

FIG. 2 is a block diagram illustrating a computer network 201 which stores and runs the novel datasheet publishing system 101 of FIG. 1. The computer network 201 includes a plurality of computers 203a–c, each computer 203a–c respectively containing various hardware components such as a central processing unit (CPU) 205a–c, a random access memory (RAM) 207a–c and an input/output (I/O) interface 209a–c. Each computer 203a–c includes an operating system 211a–c suitable for executing an application (e.g., a JAVA application) that accesses the part characterization database 103. Such operating systems are well-known and include OS/2, DOS, DOS/Windows, etc.

The novel datasheet publishing system 101 includes the part characterization database 103 stored on the first computer 203a, the data entry tool 105 stored on the second computer 203b and the publishing interface 107 stored on the third computer 203c. Alternatively, the part characterization database 103, the data entry tool 105 and/or the publishing interface 107 may be stored on the same computer (e.g., on any one of the computers 203a–c or on a stand alone desktop (not shown)), if desired. For convenience, the part characterization database 103, the data entry tool 105 and the publishing interface 107 are shown physically connected to the computers 203a–c, respectively.

A communication network 213, such as a local area network (LAN) or a wide area network (WAN), couples each of the computers 203a–c, so that the computers 203a–c can communicate with each other over the communication network 213. The communication network 213 therefore couples the part characterization database 103 to the data entry tool 105 and to the publishing interface 107. The part characterization database 103, the data entry tool 105 and the publishing interface 107 can be located on any computer (having a suitable operating system) coupled to the communication network 213; the computer network 201 of FIG. 2 merely exemplifies one possible configuration.

Each of the part characterization database 103, the data entry tool 105 and the publishing interface 107 is a computer program product comprising a computer readable media or carrier 215a–c having computer program logic recorded thereon; and each is read by a storage device such as a floppy drive unit, a hard drive unit, a tape backup unit, etc., represented generally by the reference number 217a–c, respectively. The storage devices 217a–c may store the part characterization database 103, the data entry tool 105 and the publishing interface 107, or alternatively, the computer program logic within each may be loaded from the carriers 215a–c to other storage locations via the storage devices 217a–c. Thereafter, the first computer 203a stores the part characterization database 103 and the second CPU 205b and the third CPU 205c execute the data entry tool 105 and the publishing interface 107, respectively, enabling a user to interface the part characterization database 103 via the data entry tool 105 on the second computer 203b and to publish datasheets based on data within the part characterization database 103 via the publishing interface 107 on the third computer 203c, as described below.

As stated, the inventive part characterization database 103 serves as the primary repository of part characterization information. Within the part characterization database 103, every part (e.g., electronic component) is defined by a unique set of identifying properties or "characteristics" (e.g., technical characteristics) that distinguish the part from all other parts. No two parts have the same identifying characteristics, and each unique set of identifying characteristics is assigned a part number.

The process of adding characteristics to a part is called "characterization", and a part may have characteristics not used for identification purposes (i.e., non-identifying characteristics). Note that as used herein "characteristics" used without the modifier "identifying" or "non-identifying" may include identifying and/or non-identifying characteristics.

In addition to parts, the part characterization database 103 contains "part groups" which also are defined by a set of identifying characteristics. Part groups contain non-identifying characteristics that provide additional information appropriate to the part groups, can be created independently of parts and contain no reference to individual parts. Rather, a part belongs by implication to part groups defined by identifying characteristics that match the identifying characteristics of the part, and the values for a part group's non-identifying characteristics are valid for all parts that share the part group's identifying characteristics.

To clarify the relationship between parts and part groups, assume a part has the following identifying characteristics:

| Part Number | Identifying Characteristics |
| --- | --- |
| ABC1234 | Family = memory<br>Type = DRAM<br>Package = TSOP<br>$V_{CC}$ = 3.3 v<br>$T_{CK}$ = 10 nsec<br>CAS = 3<br>Access Mode = Synchronous<br>Memory Size = 64 Mbits |

The part also may have numerous non-identifying characteristics (not shown). If DRAM is a part group, by specifying DRAM as an identifying characteristic of part number ABC1234, the part will automatically inherit all information (e.g., non-identifying characteristics) associated with the DRAM part group. This may comprise thousands of DRAM properties such as operating temperatures, timing diagrams, DC and AC electrical characteristics, etc. The part/part group structure enables engineers and others tasked with component characterization to enter data (e.g., values for certain non-identifying characteristics) that applies by definition to multiple parts only once via an appropriate part group rather than for each individual part that shares the data.

Within the semiconductor memory industry, certain characteristics such as operating temperature, capacitance, DC and AC electrical characteristics, etc., may be shared by numerous parts. By having these characteristics associated with a part group shared by multiple parts, each part's characteristics may be maintained merely by maintaining the part group's characteristics (rather than each individual part's characteristics). For example, the detailed timing specifications for dozens of parts in a family of memories offered with different organizations, addressing and packaging can be managed in a few special part groups defined by chip design and clock speed, and all current characteristics for the parts can be managed in overlapping part groups defined by chip design and power profile. In this manner, changes, which typically are technology or standard driven, can be entered once for all devices to which they apply (e.g., by altering appropriate characteristics of part groups rather than the characteristics of individual parts). Additionally, parts having any combination of product options can be characterized merely by combining appropriate part groups having the desired characteristics (e.g., characteristics can exist in the database for "virtual" parts not even considered by designers). As described below, part datasheets thereafter may be immediately generated for such virtual parts. "Modules" containing one or more parts may be similarly maintained via part groups.

In addition to the concepts of parts, part groups and identifying characteristics, the part characterization database 103 employs a unique part classification tree that allows a user to establish a hierarchical relationship between various sets of characteristics and the parts defined thereby. For example, an exemplary classification tree for a memory is shown below:

1. Memory
2. DRAM
3. Synchronous
4. Device

At the highest level of the classification tree is the tree node "Memory". Thereunder are the DRAM tree node (e.g., DRAM is a "child" tree node of the "parent" tree node Memory), the Synchronous tree node (e.g., Synchronous is a child tree node of the parent tree node DRAM) and the Device tree node (e.g., Device is a child tree node of the parent tree node Synchronous), respectively. This hierarchical classification tree structure facilitates organization and subsequent navigation of data within the part characterization database 103 (as described below).

The key to understanding how information is organized within the part characterization database 103 is understanding the relationship between parts and part groups (e.g., whether a part is a member of a part group). To determine whether a part is a member of a part group, the following six steps are performed by program code within the parts characterization database 103:

1. develop a list of all possible identifying characteristics for a part group;
2. determine which identifying characteristics for the part group actually have values;
3. develop a list of values for the part group's identifying characteristics;
4. develop a list of identifying characteristics for the part;
5. develop a list of values for the part's identifying characteristics; and
6. compare the two lists of values to determine if the part qualifies for membership in the group.

Preferably these steps are performed automatically, although the steps may be performed manually if desired.

To develop a list of all possible identifying characteristics for a part group, the part group is examined to determine a tree location pointer for the part group. The tree location pointer points to a tree node of the classification tree associated with the part group. The tree node then is examined to determine the pointers associated with the tree node. As described below with reference to FIG. 3, the tree node contains at least two pointers:

1. a pointer to the identifying characteristics that are valid at the tree node's level of the classification tree; and
2. a pointer to the tree node's parent tree node.

Figure 3:
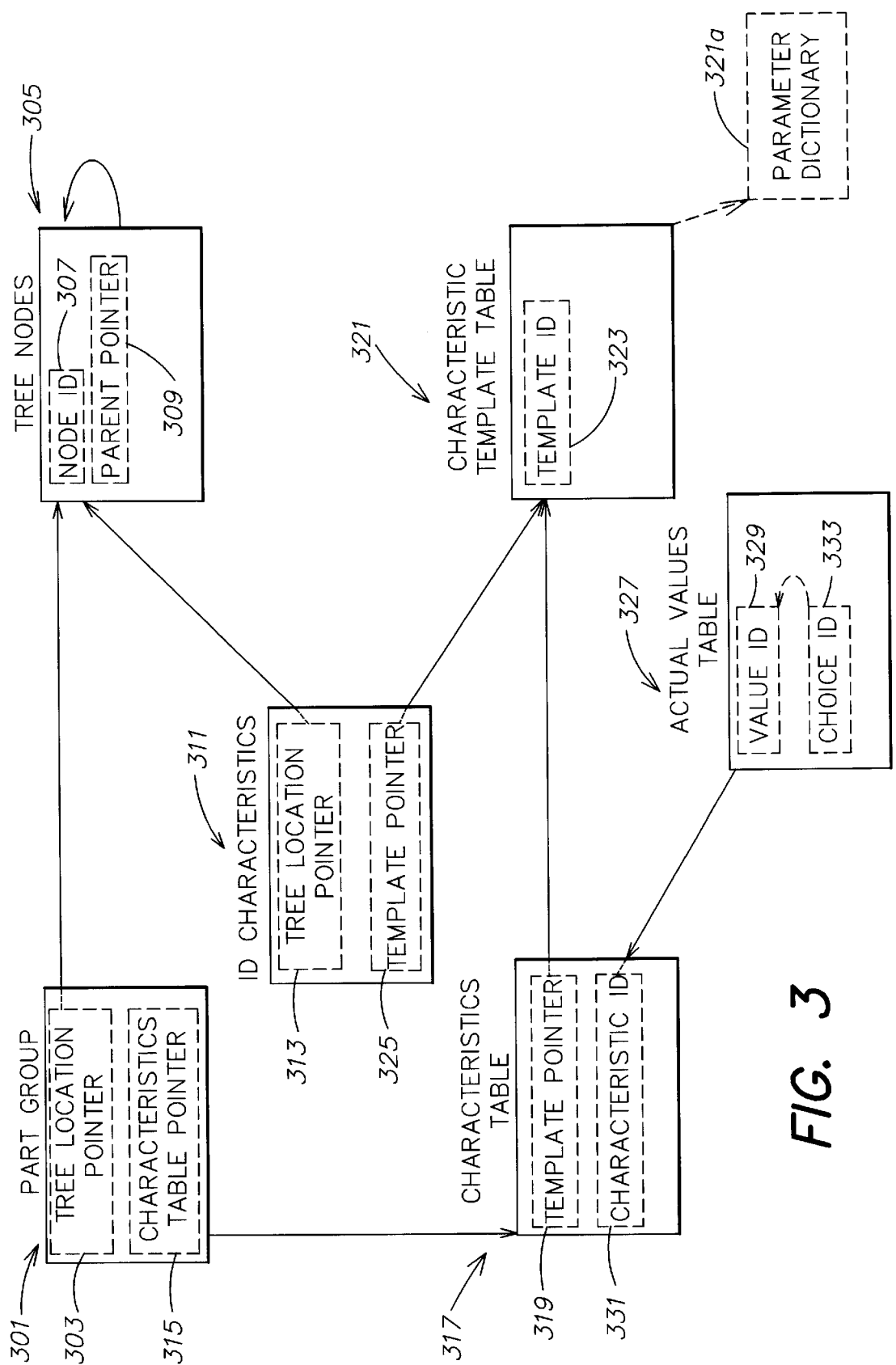
FIG. 3 is a block diagram depicting the relationship between a part group and its identifying characteristics within the datasheet publishing system of FIG. 1.

FIG. 3 is a block diagram depicting the relationship between a part group 301 and its identifying characteristics. With reference to FIG. 3, the part group 301 is shown comprising a tree location pointer 303 that points to a particular location or level of tree nodes 305 of a classification tree (not shown) identified by a node identification (ID) 307 and having a parent node pointer 309. Also shown are a set of identifying characteristics 311 that correspond to the tree node ID 307 (e.g., as indicated by tree location pointer 313).

To begin developing a list of all possible identifying characteristics for the part group 301, all identifying characteristics whose tree location pointer matches the node ID 307 (e.g., the tree location pointer 313) are retrieved. The parent node to which the parent node pointer 309 points then is examined.

The parent node pointer 309 is a pointer to the parent node of the tree node 305, and has a non-zero when a parent node exists for the current tree node. If the parent node pointer 309 is non-zero, all identifying characteristics (not shown) whose tree location pointer matches the node ID (not shown) for the parent node are retrieved. This process of examining parent nodes and retrieving identifying characteristics associated therewith is repeated until all possible identifying characteristics from all relevant parent nodes are retrieved (e.g., until a zero valued parent node pointer is found). In this manner, a list of all ID characteristics for the part group 301 is retrieved.

Unlike a part, a part group can be created which does not specify values for all of its identifying characteristics. This feature allows part groups to have different scopes. For example, if a part group is created that only specifies a value for one identifying characteristic, then the part group applies to all parts having an identifying characteristic with the value regardless of the values set for other identifying characteristics of the part.

In addition to the tree location pointer 303, the part group 301 comprises a characteristics pointer 315 that points to a characteristics table 317 for the part group 301. The characteristics table 317 in turn contains a characteristic template pointer 319 to a characteristic template table 321. Specifically, the characteristic template pointer 319 points to a template (template ID 323) applicable to the identifying characteristics of the part group 301. The identifying characteristics 311 also comprises a characteristic template pointer 325 to the characteristic template table 321.

To determine which identifying characteristics for the part group 301 actually have values, the characteristic template pointer 319 of the characteristics table 317 is matched to the characteristic template pointer 325 of the identifying characteristics 311. In this manner, only characteristics having parameters relevant to the part group 301's identifying characteristics (identified by examining the tree nodes 305) are analyzed (as described below), and a list of identifying characteristics for the part group 301 which actually have values is developed.

To understand how the values for the above described identifying characteristics are determined, knowledge of the internal structure of each characteristic stored within the part characterization database 103 is required. A typical expression of a characteristic has the form:

$$V_{CC}=3.3v$$

Accordingly, characteristic information is stored within the part characterization database 103 in the form of three tables: a characteristics table (such as the characteristics table 317), a characteristic template table (such as the characteristic template table 321) and an actual values table. As stated, the characteristics table 317 contains pointers to other tables such as the characteristic template table 321. The characteristic template table 321 supplies the left hand side or "parameter" information of a characteristic. For example, the parameter information is "$V_{CC}$" in the expression above. Preferably, the characteristic template table 321 merely comprises a pointer to a parameter dictionary 321a (shown in phantom) that contains selectable parameters useable within the part group 301. Note that by employing pointers, two items may be determined to be equal by determining if the pointers (rather than the actual values) are equal.

The actual values table (e.g., table 327) contains the value portion of a characteristic's expression (e.g., 3.3 volts) stored under a value ID 329. An actual values table may exist for each characteristic (e.g., designated by a characteristic ID such as characteristic ID 331) within the characteristics table 317 or one actual values table may supply all of the values. The value ID 329, for example, may be a numeric value (e.g., 3.3 volts) and a designator such as min, max, typical, etc. When the characteristic contains an actual numerical value for a value type of "spec", the value is stored as a choice between several options (e.g., choice #1=1.8 volts, choice #2=3.3 volts, choice #3=5 volts, etc.) rather than as the value itself. A choice ID (e.g., the choice ID 333) may be used to store the choice number selected for the part group characteristic. For the expression above, the choice ID stores a "2" for choice #2=3.3 volts. In this manner, even specs may be altered globally amongst several parts merely by changing what a choice number represents.

For the subset of characteristics determined above (e.g., the identifying characteristics for the part group 301), the value of each characteristic is determined from a corresponding actual values table such as the actual values table 327. The list of values for the part group's identifying characteristics thereby is determined.

After developing a list of values for the part group's identifying characteristics, the next step in determining whether a part belongs to the group is to develop a list of identifying characteristics for the part.

Figure 4:
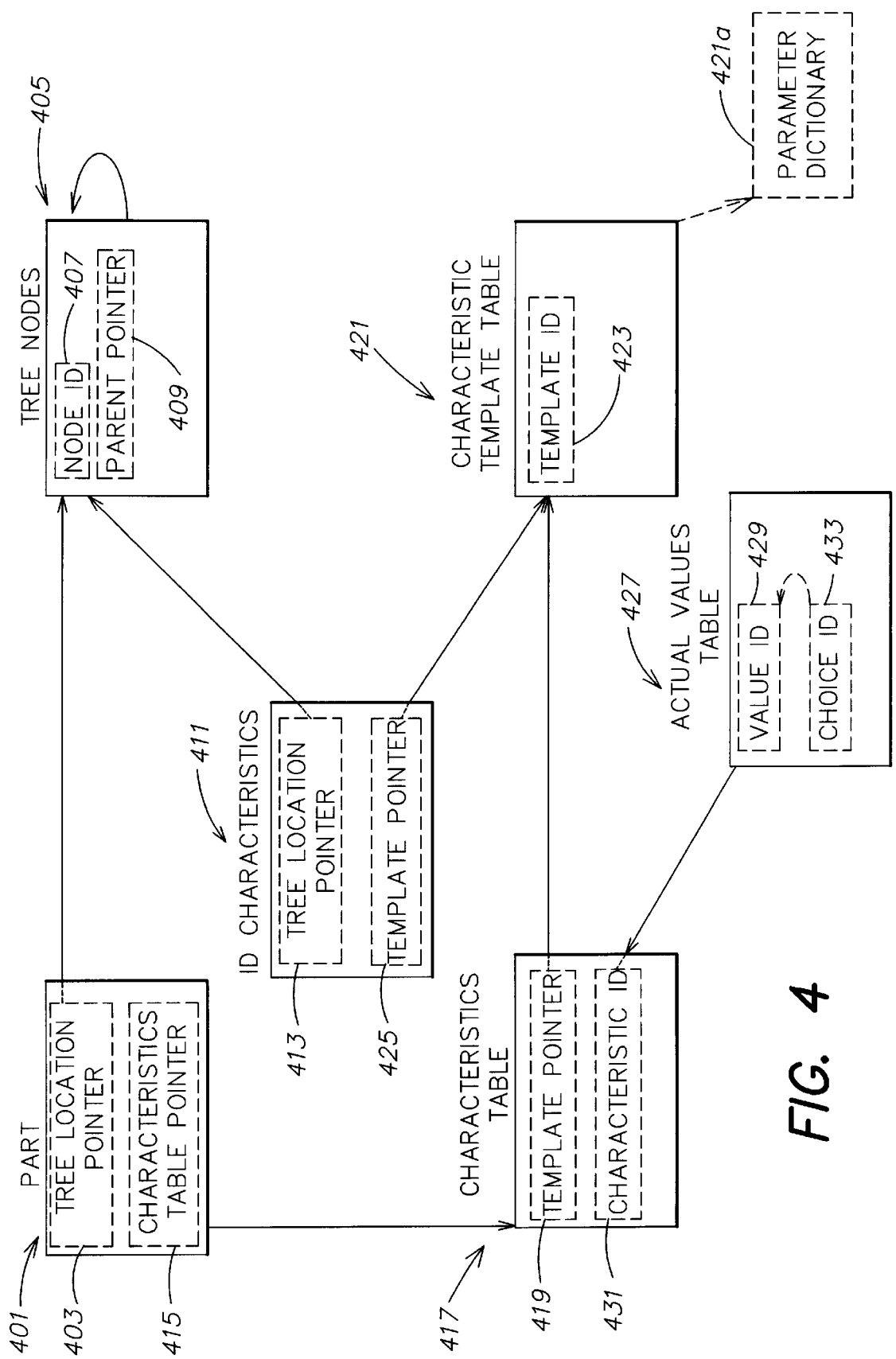
FIG. 4 is a block diagram depicting the relationship between a part and its identifying characteristics within the datasheet publishing system of FIG. 1.

FIG. 4 is a block diagram depicting the relationship between a part 401 and its identifying characteristics. As with the part group 301, the part 401 comprises a tree location pointer 403 that points to a particular location of tree nodes 405 (identified by a node ID 407, and having a parent node pointer 409). Also shown are a set of identifying characteristics 411 that correspond to the tree node ID 407 (e.g., as indicated by tree location pointer 413).

To develop a list of all possible identifying characteristics for the part 401, all identifying characteristics whose tree location pointer matches the node ID 407 (e.g., the tree location pointer 413) are retrieved. The parent node to which the parent node pointer 409 points then is examined, and relevant identifying characteristics for the part 401 are retrieved therefrom and from all other relevant parent nodes of the tree nodes 405 as previously described with reference to FIG. 3. In this manner, a list of all identifying characteristics for the part 401 is retrieved.

In addition to the tree location pointer 403, the part 401 comprises a characteristics pointer 415 that points to a characteristics table 417 for the part 401. The characteristics table 417 in turn contains a characteristic template pointer 419 to a characteristic template table 421. Specifically, the characteristic template pointer 419 points to a template (template ID 423) applicable to the identifying characteristics of the part 401. The identifying characteristics 411 also comprises a characteristic template pointer 425 to the characteristic template table 421.

As with the characteristic template table 321 of the part group 301, the characteristic template table 421 of the part 401 supplies the parameter information for characteristics of the part 401 and preferably comprises a pointer to a parameter dictionary 421a (shown in phantom) that contains selectable parameters useable within the characteristics of the part 401. An actual values table 427 is provided for each characteristic of the part 401 that contains the value portion of the characteristic (e.g., employing a value ID 429, a characteristic ID 431 and/or a choice ID 433 as previously described). Because all identifying characteristics of the part have values, there is no need to determine which characteristics have values. By employing the characteristic template ID 423 in conjunction with the characteristics table 417, the actual values table for each characteristic of the part 401 (e.g., the actual values table 427, or a plurality of actual values tables), a list of values for the part 401's identifying characteristics thereby is determined.

Once the list of values for the part group 301's identifying characteristics and the list of values for the part 401's identifying characteristics are determined, the two lists are compared. Typically a part is a member of several part groups and thus has a longer identifying characteristics list than that of a part group. If all values for the part group 301's identifying characteristics match the values for the part 401's identifying characteristics, the part 401 is considered to be a member of the part group 301. All identifying and non-identifying characteristics of the part group 301 thereby are automatically inherited by the part 401.

Each of the six steps described above can be implemented within any relational database employing structured query language (SQL) as is known in the art. For example, nested SQL queries may be employed to generate the list of identifying characteristics for the part group 301 and for the part 401. Views that provide such information as lists of parts sorted by part groups, lists of parts that are members of a part group, etc., may be provided to expedite developer programming.

As stated, the data entry tool 105 comprises a computer program product that serves as the primary interface to the part characterization database 103. Preferably the data entry tool 105 comprises a graphical user interface (GUI) that allows a user to perform such functions as adding parts, part groups, characteristics and parameters to the part characterization database 103, and that allows editing/maintaining of the same. The data entry tool 105 preferably allows for maintenance of the classification tree as well.

FIG. 5 is an exemplary GUI for adding a part to the part characterization database 103 (e.g., add part GUI 501). As shown is FIG. 5, information such as part number, pin count, mode group and various identifying and non-identifying characteristics may be easily added for each part. Also, characteristics may be selected for inclusion within the classification tree. FIG. 6 is an example of a GUI for adding a part group to the part characterization database 103 (e.g., add part group GUI 601). As previously stated, the use of part groups allows shared characteristics to be maintained in one location rather than in a separate location for each individual part.

Similar GUIs preferably are employed to edit parts and part groups, as well as to add/edit characteristics for parts and part groups, and parameters for characteristics. For characteristics that are valid only under certain test conditions (e.g., test "characteristics" such as ambient temperature, bias voltage, etc.), preferably "conditions" are defined within the part characterization database 103 that may be associated with appropriate parts or part groups. Condition "groups" also may be employed to associate conditions to numerous parts or part groups in a manner similar to the part/part group relationship. Other functions such as copying or cloning parts/part groups may be employed to expedite data entry.

Figure 7:
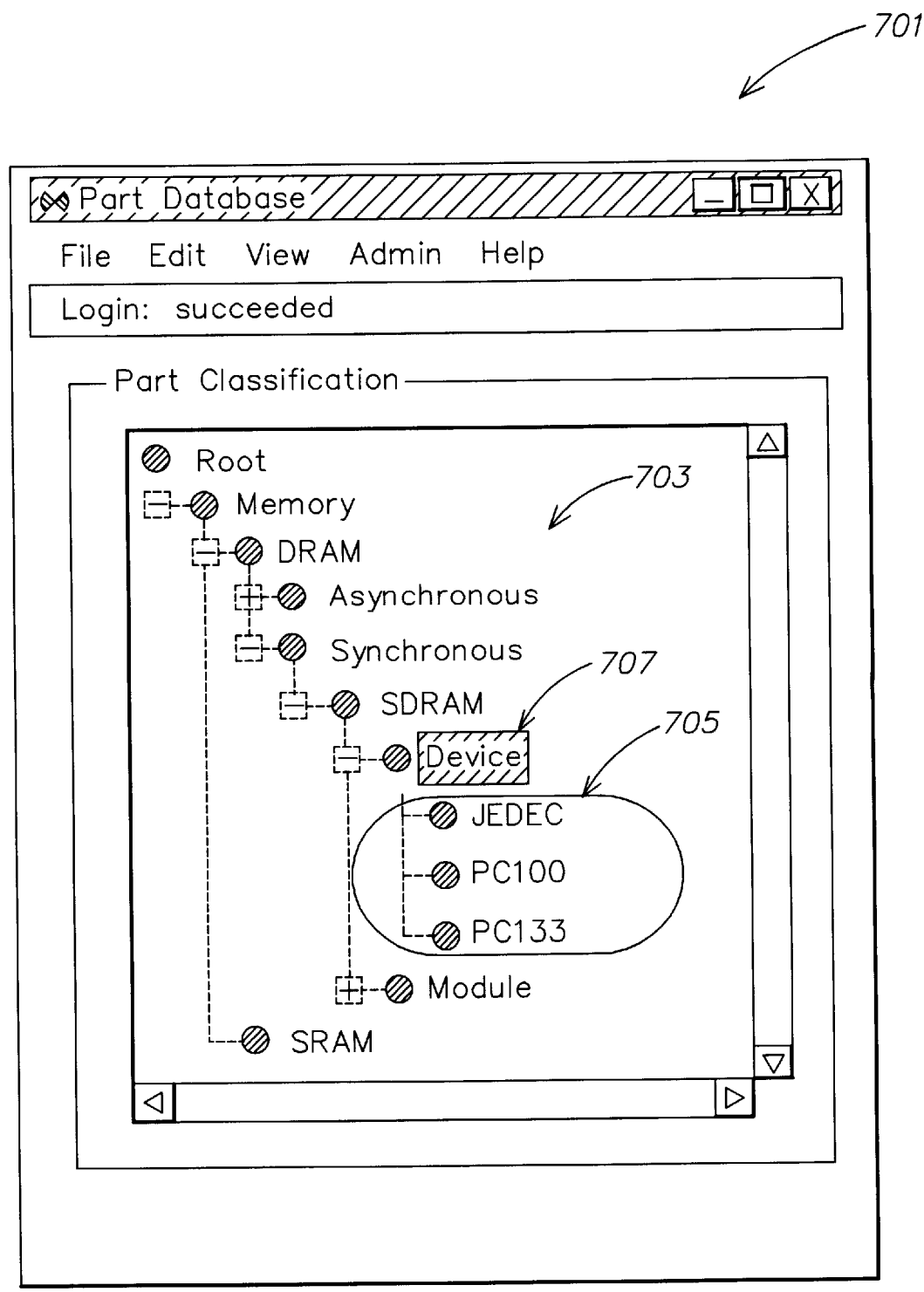
FIG. 7 is a representative GUI depicting a part characterization database classification tree having seven levels of tree nodes.

The classification tree of the part characterization database 103 preferably is maintained by employing branching/ unbranching functions at the various nodes of the classification tree. For example, FIG. 7 is a representative GUI 701 depicting a part characterization database classification tree 703 having seven levels of tree nodes. Program code within the data entry tool 105 allows the seventh level 705 (e.g., JEDEC, PC100 and PC133) to be added to the classification tree 703 merely by selecting the appropriate sixth level node 707 (e.g., Device) and by executing a "branch" command. Tree nodes may be similarly eliminated via an "unbranch" command.

The publishing interface 107 similarly comprises a computer program product that provides an interface from the part characterization database 103 to publishing tools (e.g., Adobes® Framemaker™ and SGML). By employing the publishing interface 107, publishing tools may access the part characterization database 103 to affect automated and real time generation of part datasheets as described below.

Figure 8:
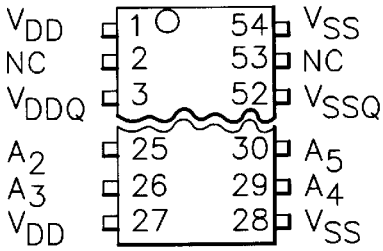
FIG. 8 is an exemplary part datasheet generated employing the novel datasheet publishing system of FIG. 1.
Figure 9:
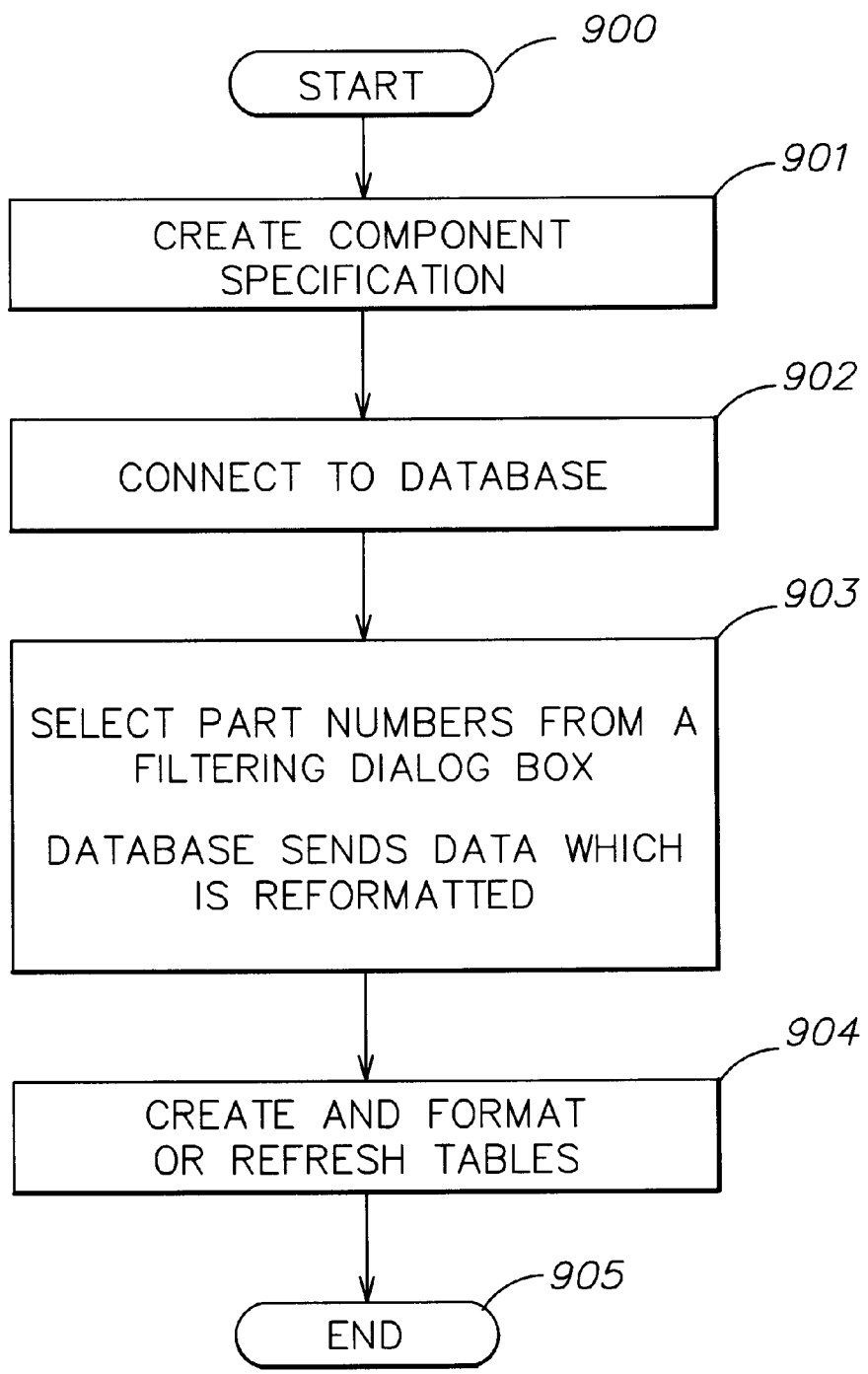
FIG. 9 is a flowchart of a part datasheet generation process described with reference to FIG. 8.

FIG. 8 is an exemplary part datasheet 801 generated employing the novel datasheet publishing system 101 of FIG. 1. FIG. 9 is a flowchart of the part datasheet generation process described with reference to FIG. 8. To create the part datasheet 801, a publishing tool such as Adobe® Framemaker™ is employed to generate a component specification sheet containing manually entered information (STEP 901). With reference to FIG. 8, FEATURES information 803, DESCRIPTION information 805, PIN ASSIGNMENTS information 807 and PIN DESCRIPTION 809 are manually entered via a conventional publishing tool.

Thereafter, the publishing interface 107 is employed to connect to and access part information stored within the part characterization database 103 (STEP 902). The desired part numbers contained within the part characterization database 103 then are selected (preferably via a GUI, not shown) by a user of the publishing interface 107, and the part characterization database 103 transfers data for the selected part numbers to the publishing tool (STEP 903). Note that data is collected for all chosen parts from all part groups with identifying characteristics that match those of the chosen parts.

Once the part data is retrieved by the publishing interface 107, the part data is automatically formatted within the component specification sheet (STEP 904). For example, the part data may be formatted into tables ("presentation tables") having a selected number of columns and rows, or into some other desired format. With reference to FIG. 8, the publishing interface 107 automatically generates a pin description table 811, OPERATING, STANDBY AND REFRESH CURRENT header 813 and OPERATING, STANDBY AND REFRESH CURRENT table 815 as shown. The part datasheet generation process then ends (STEP 905).

Preferably the format with which part data retrieved from the part characterization database 103 is stored within the part datasheet 801 is user-selectable (e.g., the type of table, fonts, etc.). A database may be provided with a plurality of use-selectable formatting options (e.g., a presentation table database with a plurality of presentation tables or other formatting options). Once generated, the part datasheet 801 can be updated merely by reconnecting to the part characterization database 103 to retrieve updated part information. Datasheets thereby may be generated in real time.

While the present invention has been described with reference to part databases, it will be understood that, in general, the characteristics of any data item (e.g., DNA type matching information, toxicological information, etc.) similarly may be stored within a database by:

1. defining a data item group within the database by a set of identifying characteristics;
2. providing the data item group with one or more non-identifying characteristics;
3. defining the data item within the database by a set of identifying characteristics;
4. assigning the data item as a member of the data item group if the data item has identifying characteristics that match the identifying characteristics of the data item group; and
5. associating non-identifying characteristics of the data item group with the data item if the data item is a member of the data item group (e.g., if a database query is performed to obtain the characteristics of a data item, supplying the non-identifying characteristics of any data item groups of which the data item is a member along with the data item's identifying characteristics).

By having characteristics associated with a data item group shared by multiple data items, each data item's characteristics may be maintained merely by maintaining the data item group's characteristics (rather than each individual data item's characteristics).

The foregoing description discloses only the preferred embodiments of the invention, modifications of the above disclosed apparatus and method which fall within the scope of the invention will be readily apparent to those of ordinary skill in the art. For instance, the inventive datasheet publishing system may be used with any publishing tool such as HTML, Adobe® Acrobat™, and may be used to generate datasheets in compliance with the Pinnacles Component Interchange Standard V1.4 (PCIS).

Accordingly, while the present invention has been disclosed in connection with the preferred embodiments thereof, it should be understood that other embodiments may fall within the spirit and scope of the invention, as defined by the following claims.

The invention claimed is:

1. A method for publishing part datasheets comprising the steps of:
   creating a parts classification database;
   ascertaining the technical characteristics of parts in the database;
   creating part groups based on common technical characteristics of parts;
   linking each part to the identifying characteristics of each part, said linking comprising associating each part with one or more part groups that each part belongs to;
   creating a database tree based on the technical characteristics of parts; and
   providing a presentation table database linked to the technical characterization and part groups which provides context to the technical characteristics and part group accessing the database tree through a part's technical characterization.

2. The method of claim 1, wherein creating a database tree comprises creating the database tree such that nodes of the database tree are organized according to parent-child hierarchical relationships between the technical characterizations and such that identifying characteristics of a child tree node include the identifying characteristics of a parent tree node.

3. A method for publishing part datasheets comprising the steps of:
   creating a part characterization database;
   ascertaining the technical characteristics of parts in the database;
   creating part groups based on common technical characteristics of parts;
   linking each part to the identifying characteristics of each part, said linking comprising associating each part with one or more part groups that each part belongs to;
   creating a database tree based on the technical characteristics of parts; and
   providing a publishing interface coupled to the part characterization database, the publishing interface for coupling a publishing tool to the part characterization database so as to provide context to the technical characteristics of one or more parts characterized within the part characterization database.

4. The method of claim 3 wherein the part characterization database comprises a relational database.

5. The method of claim 3 wherein ascertaining the technical characteristics of parts in the database comprises defining each part within the database by the identifying characteristics of each part.

6. The method of claim 5 further comprising providing one or more parts within the database with one or more non-identifying characteristics.

7. The method of claim 3 wherein creating part groups based on common technical characteristics of parts comprises defining each part group within the database by a set of identifying characteristics.

8. The method of claim 7 further comprising providing one or more part groups within the database with one or more non-identifying characteristics.

9. The method of claim 3 further comprising associating part and part groups with the tree nodes of the database tree.

10. The method of claim 3 wherein providing a publishing interface coupled to the part characterization database comprises providing at least one presentation table which provides context to the technical characteristics of one or more parts characterized within the part characterization database.

11. The method of claim 10 wherein providing at least one presentation table comprises providing a presentation table database having a plurality of user-selectable presentation tables each of which provides context to the technical characteristics of one or more parts characterized within the part characterization database.

12. The method of claim 10 further comprising
   providing a publishing tool;
   coupling the publishing tool to the part characterization database with the publishing interface; and
   generating a part datasheet employing the publishing tool, the publishing interface and the part characterization database.

13. The method of claim 12 wherein generating a part datasheet comprises:
   opening an existing part datasheet with the publishing tool;
   connecting to the part characterization database with the publishing interface; and
   updating at least one presentation table within the part datasheet with technical characteristics from the part characterization database.

14. The method of claim 12 wherein generating a part datasheet comprises:
   generating a new part datasheet with the publishing tool;
   connecting to the part characterization database with the publishing interface;
   accessing part information stored within the part characterization database;
   transferring part information from the part characterization database to the publishing tool; and
   employing at least one presentation table of the publishing interface to format the retrieved part information within the part datasheet.

15. The method of claim 14 wherein accessing part information stored within the part characterization database comprises;
   selecting a part characterized within the part characterization database;
   retrieving characteristics for the selected part;
   determining all part groups of which the part is a member; and
   retrieving characteristics from each part group of which the part is a member.

16. The method of claim 3, wherein creating a database tree comprises creating the database tree such that nodes of the database tree are organized according to parent-child hierarchical relationships between the technical characterizations and such that identifying characteristics of a child tree node include the identifying characteristics of a parent tree node.

17. A computer program product for use in publishing part datasheets comprising:
- a medium readable by a computer, the computer readable medium having;
- means for creating a part characterization database;
- means for ascertaining the technical characteristics of parts in the database;
- means for creating part groups based on common technical characteristics of parts;
- means for linking each part to the identifying characteristic of each part, said linking comprising associating each part with one or more part groups that each part belongs to;
- means for creating a database tree based on the technical characterization of parts; and
- means for providing a publishing interface coupled to the part characterization database, the publishing interface for coupling a publishing tool to the part characterization database so as to provide context to the technical characteristics of one or more parts characterized within the part characterization database.

18. The computer program product of claim 17 wherein the means for ascertaining the technical characteristics of part in the database comprises means for defining each part within the database by the identifying characteristics of each part.

19. The computer program product of claim 17 wherein the means for creating part groups based on common technical characteristics of parts comprises means for defining each part group within the data by a set of identifying characteristics.

20. The computer program product of claim 17 wherein the means for providing a publishing interface coupled to the part characterization database comprises means for providing at least one presentation table which provides context to the technical characteristics of one or more parts characterized within the part characterization database.

21. The computer program product of claim 17 wherein the means for determining if a part is a member of a part group.

22. The computer program product of claim 21 wherein the means for determining if a part is a member of a part group comprises:
- means for developing a list of all possible identifying characteristics for the part group;
- means for determining which identifying characteristics for the part group actually have values;
- means for developing a list of values for the part group's identifying characteristics;
- means for developing a list of identifying characteristics for the part;
- means for developing a list of values for the part's identifying characteristics; and
- means for comparing the two lists of values to determine if the qualifies for membership in the group.

23. The method of claim 17, wherein creating a database tree comprises creating the database tree such that nodes of the database tree are organized according to parent-child hierarchical relationships between the technical characterizations and such that identifying characteristics of a child tree node include the identifying characteristics of a parent tree node.

24. A method of storing characteristics associated with data item within a database comprising:
- defining a data item group within the database by a set of identifying characteristics;
- providing the data item group with one or more non-identifying characteristics;
- defining the data item within the database by a set of identifying characteristics;
- assigning the data item as a member of the data item group if the data item has identifying characteristics that match the identifying characteristics of the data item group;
- linking each data item to the identifying characteristics of each data item, said linking comprising associating each data item with one or more data item groups that each data item belongs to; and
- associating one or more non-identifying characteristics of the data item group with the data item if the data item is a member of the data item group.

25. The method of claim 24 wherein assigning the data item as a member of the data item group if the data item has identifying characteristics that match the identifying characteristics of the data item group comprises:
- developing a list of all possible identifying characteristics for the data item group;
- determining which identifying characteristics for the data item group actually have values;
- developing a list of values for the data item group's identifying characteristics;
- developing a list of identifying characteristics for the data item;
- developing a list of values for the data item's identifying characteristics; and
- comparing the two lists of values to determine if the data item qualifies for membership in the group.

26. The method of claim 24 wherein the data item comprises a part and wherein the data item group comprises a part group.

27. A computer program product for use in storing characteristics associated with a data item within a database comprising:
- a medium readable by a computer, the computer readable medium having;
- means for defining a data item group within the database by a set of identifying characteristics;
- means for providing the data item group with one or more non-identifying characteristics;
- means for defining the data item within the database by a set of identifying characteristic;
- means for assigning the data item as a member of the data item group of the data item has identifying characteristics that match the identifying characteristics of the data item group;
- means for linking each data to the identifying characteristics of each data item, said linking comprising associating data item with one or more data item groups that each data item belongs to; and
- means for associating one or more non-identifying characteristics of the data item group with the data item if the data item is a member of the data item group.

28. The computer program product of claim 27 wherein the means for associating one or more non-identifying characteristics of the data item group with the data item if the data item is a member of the data item group comprises means for supplying one or more non-identifying characteristic of any data item groups of which the data item is a member along with the data item' identifying characteristics during a query of the database to obtain the characteristics of a data item.

29. The computer program product of claim 27 wherein the data item comprises a part and wherein the data item group comprises a part group.

30. An apparatus adapted to publish part datasheets comprising:

a part characterization database adapted to store technical characteristics of parts, adapted to facilitate creation of part groups based on common technical characteristics of parts, adapted to link each part to the identifying characteristics of each part by associating each part with one or more part groups that each part belongs to, and adapted to facilitate creation of a database tree based on the technical characteristics of parts; and a publishing interface coupled to the part characterization database and adapted to couple a publishing tool to the part characterization database so sa to provide context to the technical characteristics of one or more parts characterized within the part characterization database.

31. The apparatus of claim 30 wherein each part group within the part characterization database is defined by a set of identifying characteristics.

32. The apparatus of claim 31 wherein one or more part groups within the part characterization database comprises one or more non-identifying characteristics.

* * * * *